United States Patent [19]

Hojnoski

[11] Patent Number: 4,558,639
[45] Date of Patent: Dec. 17, 1985

[54] INSERT FOR A CONTAINER FOR AGING WINE

[75] Inventor: David E. Hojnoski, Smithville, Canada

[73] Assignee: Jalger Limited, Winona, Canada

[21] Appl. No.: 620,708

[22] Filed: Jun. 14, 1984

[51] Int. Cl.⁴ .............................................. C12H 1/22
[52] U.S. Cl. .................................... 99/277.1; 426/15
[58] Field of Search ................... 99/277, 277.1, 277.2, 99/278, 276; 426/15, 422

[56] References Cited

U.S. PATENT DOCUMENTS

| | | | |
|---|---|---|---|
| 2,017,235 | 10/1935 | Drew | 99/277.1 |
| 2,135,622 | 11/1938 | Nagle | 99/277.1 |
| 2,289,245 | 7/1942 | Dant | 99/277.1 |
| 2,657,629 | 11/1953 | Gibson | 99/277.1 |
| 3,021,780 | 2/1962 | Bobbe | 99/277.1 |

Primary Examiner—Robert W. Jenkins
Attorney, Agent, or Firm—Littlepage & Webner

[57] ABSTRACT

A pre-assembled insert for a container used for aging wine has multiple planar members angularly disposed about a central shaft wherein the parameters of the oxidation and extraction reactions occurring during aging of the wine are known as a function of the surface:volume relationship of the container and its insert.

4 Claims, 7 Drawing Figures 4,558,639

INSERT FOR A CONTAINER FOR AGING WINE

BACKGROUND OF THE INVENTION

In the production of wine, reproducibility of the desirable sensory characteristics of the wine such as bouquet, color and flavor, which come from the oxidation and extraction reactions occuring during aging of the wine, has not hitherto been controllable, and has required extensive expenditures of time and money to achieve results using traditional wine barrels.

SUMMARY OF THE INVENTION

The present invention relates to an apparatus for the aging of wines in containers, such as oak barrels, in which the parameters of the oxidation and extraction reactions occurring during the aging of the wine are known as a function of the surface:volume relationship of the container and its novel insert.

An object of the invention is to provide an apparatus in which the aging of the wine is controllable and reproducible. A further object of the invention is to provide an insert for a barrel or other storage vessel for wine which may be designed according to the properties required in the aged wine.

These and other objects will be apparent from the following specification and drawings in which.

Figure 1:
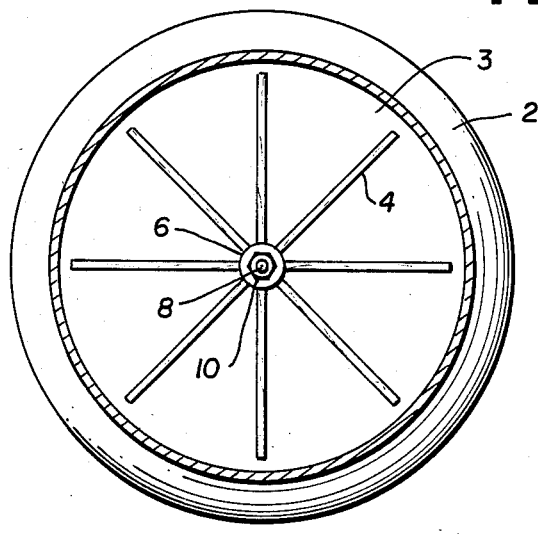
FIG. 1 is a horizontal cross-section of the apparatus showing the planar members disposed radially in vertical planes about the central shaft in a wine barrel.
Figure 3:
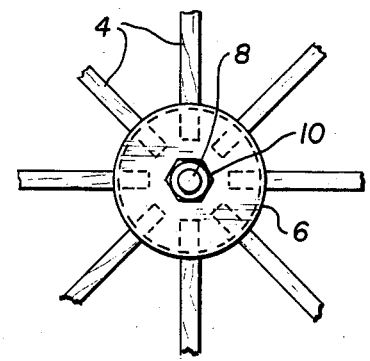
FIG. 3 shows in detail a top view of the central core shown in FIG. 1.
Figure 4:
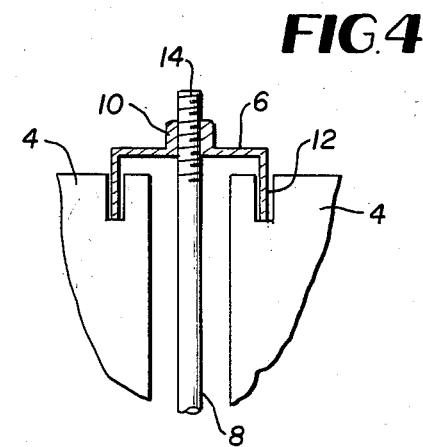
FIG. 4 shows in detail a method of securing the planar members to the shaft in the apparatus of FIG. 1.
Figure 2:
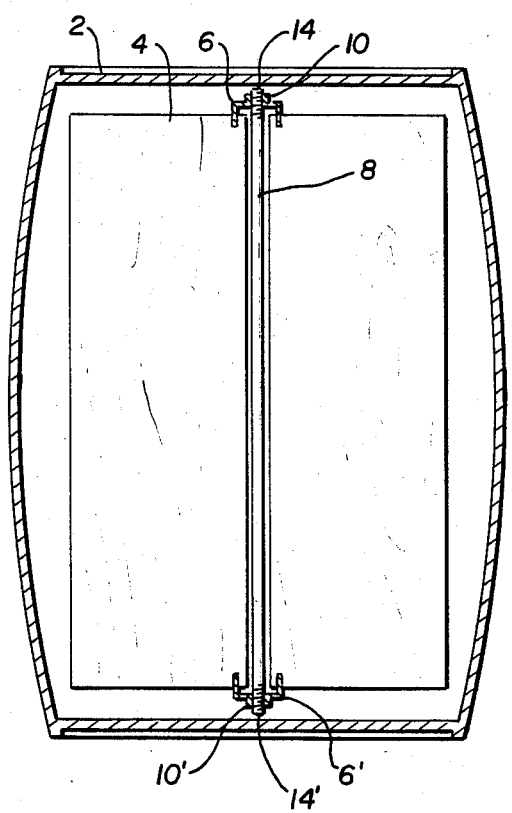
FIG. 2 is a vertical cross section of the apparatus of FIG. 1.
Figure 5:
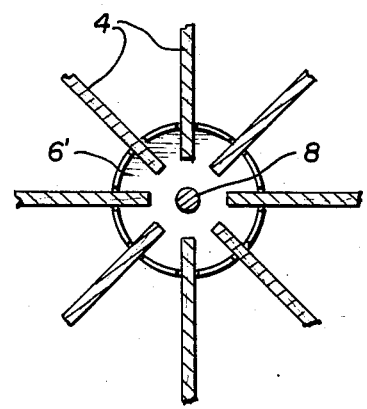
FIG. 5 shows in detail a top view of the attachment of planar members at the bottom of the apparatus shown in FIG. 1.

Referring to the drawings in which like numerals denote similar elements, FIGS. 1–5 represent an embodiment in which the planar members of the insert are disposed radially in the wine barrel. FIG. 1 shows a horizontal cross-section of a wine barrel or other wine storage vessel 2. Within the barrel 2 is an insert 3 of the invention which is sized so that it extends substantially from one end of the storage vessel to the other. The insert 3 comprises planar members 4, such as blades, which are angularly disposed about a central shaft 8. The blades 4 are preferably fabricated from quarter-sawed oak, and the shaft 8 is preferably of stainless steel. The blades 4 are attached to the center shaft 8 as shown in FIGS. 2–5 by means of stainless steel cups 6 at top and bottom of the shaft 8 which engage in slots 12 in the ends of the planar oak blades. Each cup 6, 6' is secured to shaft 8 by nuts 10, 10' preferably of stainless steel, on threaded ends 14, 14' of shaft 8.

Figure 6:
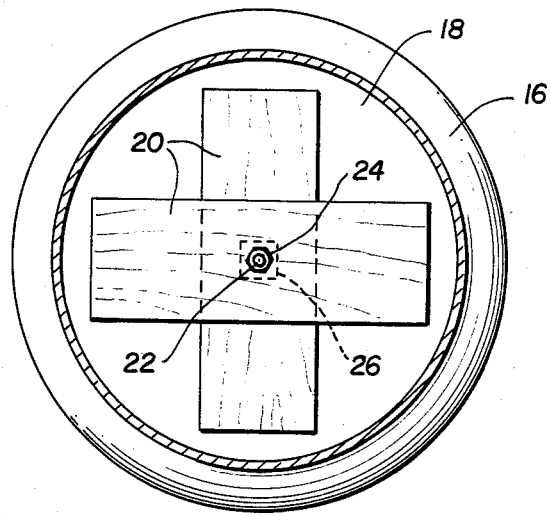
FIG. 6 is a horizontal cross-section of an apparatus of the invention showing the planar members of the barrel insert disposed in horizontal planes about the central shaft.
Figure 7:
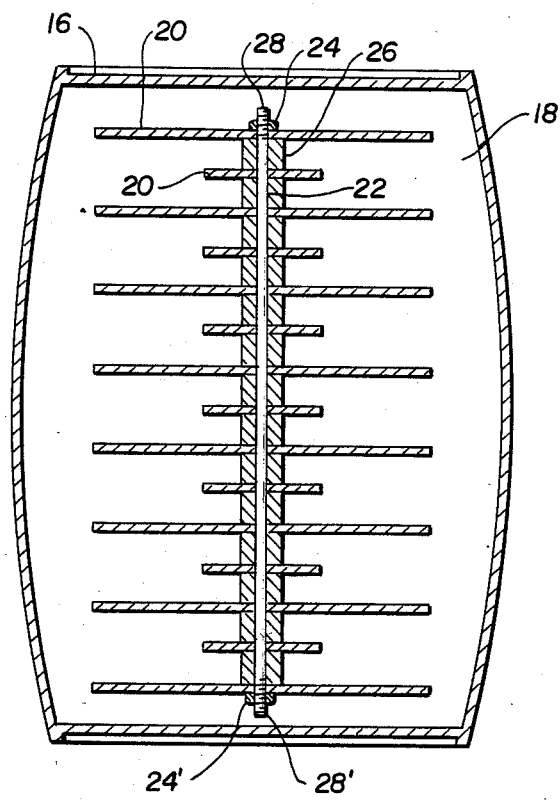
FIG. 7 is a vertical cross section of the apparatus of FIG. 6.

FIGS. 6–7 show another embodiment of the invention in which the planar members are angularly disposed horizontally from the center shaft in a tiered arrangement.

Referring to FIGS. 6–7, the wine container, shown here as barrel 16, contains an insert 18 which has a tiered arrangement of planar members 20, which may be of different sizes as shown in FIG. 7. Planar members 20, preferably oak blades are separated by spacers 26, preferably also of oak, and each has a hole through which it is threaded onto shaft 22. Nuts 24, 24' hold the oak blades 20 in place on threaded ends 28, 28' of shaft 22. The insert of the invention, which may be preassembled, greatly increases the wood/wine (surface:volume) relationship compared to that found in a traditional wine barrel not containing an insert. The parameters of the oxidation and extraction reactions occurring during aging of the wine are determined as a function of the surface:volume relationship of the container and its insert and thus may be predicted and controlled reproducibly from batch to batch. A further advantage of the invention is that the time required for wine aging is reduced, accelerated reaction times also being a function of the increased surface:volume relationship.

The preassembled insert is predominantly made of wood, preferably oak. The blades may be of solid quarter-sawed oak, approximately $\frac{1}{4}''$ in thickness or of other suitable wood and other suitable dimensions. The oak insert is placed in a storage vessel which may be a standardized wine industry oak barrel of approximately 205 liter capacity, or other container of suitable size and material, for example, a stainless steel or plastic storage vessel or one made of a wood other than oak. The preassembled insert is of such a size that it extends substantially from one end of the container to the other.

Any suitable configuration of blades may be used, for example, a plurality of blades extending radially from the center shaft, or a plurality of tiered blades, separated by spacers, fitted onto the center shaft, or any other appropriate arrangement apparent to one skilled in the art may be used.

The planar members, or blades, are held on the shaft which may be of stainless steel or other suitable material, by stainless steel nuts screwed to the threaded ends of the shaft or by other appropriate method. Radially spaced blades may be provided with slots in each end which engage in cups of stainless steel or other suitable material, the cups being secured to the shaft by nuts screwed to the threaded ends of the shaft. Tiered blades may be of equal or unequal size and may be arranged in any configuration which gives good circulation of the wine between the blades. Tiered blades are preferably separated by spacers which may be of oak or of other suitable material.

In wine manufacture low extraction of organic materials from the wood of the barrel and/or insert is required, and is obtained due to the low concentration of alcohol present in wine. Oxidation of the wine occurs during aging, and in addition to the extractive process, produces a mellowing of the wine. The extraction and oxidation processes occurring during wine aging provide the sensory characteristics of color, bouquet and flavor required in the wine.

In a typical oak wine barrel of approximately 205 liter capacity, the interior surface exposed to the wine has a surface area of approximately 22 sq. ft. Using a radial planar insert of the present invention, such as that shown in FIGS. 1–5, the interior surface area is increased to about 37–50 sq. ft., and using a tiered planar insert, such as that shown in FIGS. 6–7, the interior surface area increases to about 40–50 sq. ft. Other suitable designs of insert may also double the surface area compared with use of a barrel alone. These increases of 67% or more in the surface area of oak exposed to the wine allow much more rapid aging of the wine in addition to allowing the winemaker to predict and control the oxidation and extraction processes occurring during wine aging, by selecting the configuration and materials of the container insert used. Typically, the surface area of the insert is approximately equal to the surface area of the inside of the wine barrel. If the surface area of oak exposed to the wine is doubled by use of a suitably sized oak insert in an oak barrel, the aging time for the wine is reduced by 50%.

The oxidation and extraction processes occurring in the aging of wine are reproducible from batch to batch using the apparatus of the present invention due to the ability to control the size and characteristics of the inserts. Hitherto oak wine barrels, which are reused three to six times each, have imparted varying characteristics to the wine according to the age of the barrel, making reproducibility of characteristics of batches of wines difficult. The present invention, using a barrel insert, allows the winemaker to control the development of the wine aging process, speeding it up and enabling economy in the time and cost of manufacture of the wine. Neither the barrel nor the insert is charred since charring slows the extraction process, in contrast to the effect of using a barrel insert which speeds the development of wine aging.

The barrel insert may be used in aging any table or dessert wine, including but not limited to red, white, or other table wine, and sherry, port, or other dessert wine.

The advantageous sensory properties provided by use of the barrel insert of the invention were shown by blind sensory evaluation. A five-member panel evaluated the following samples:

| Sample | Barrel |
|---|---|
| 1 | Stainless steel (control) |
| 2 | oak - no insert |
| 3 | oak - vertical insert (FIGS. 1, 2) |
| 4 | oak - vertical insert (FIGS. 1, 2) |
| 5 | oak - horizontal insert (FIGS. 6, 7) |
| 6 | oak - horizontal insert (FIGS. 6, 7) |

Results showed (a) all oak aged wine was preferred over the control (sample 1), (b) sample 2 had the lowest extract impression, (c) sample 3 had the highest extract impression, and (d) samples 3, 4, 5 and 6 were all preferred over sample 2.

It will be apparent that one skilled in the art will readily be able to determine other appropriate arrangements of the apparatus according to the characteristics required in the aged wine without departing from the invention defined in the appended claims.

What is claimed is:

1. An apparatus for aging wine, comprising
   (1) a container, and
   (2) an insert for said container, comprising:
   a vertical shaft having a lower end and an upper end,
   a lower cup secured to said shaft at its lower end,
   an upper cup secured to said shaft at its upper end,
   a plurality of uncharred solid planar oak members radially disposed about said shaft, each planar oak member having a slot in its lower edge for engaging said lower cup and a slot in its upper edge for engaging said upper cup,
   wherein said planar oak members are firmly held in spaced relationship from each other by pressure exerted between said secured lower cup and second secured upper cup,
   and wherein the parameters of the oxidation and extraction reactions occurring during aging of the wine are known as a function of the surface:volume relationship of the container and its insert.

2. An apparatus of claim 1 wherein said insert is pre-assembled before placing in said container.

3. An apparatus for aging wine, comprising
   (1) a container, and
   (2) an insert for said container, comprising:
   a vertical shaft having a lower end and an upper end,
   a plurality of solid planar oak members arranged in horizontal planes on said shaft each of said members having a hole in the center thereof for engaging said vertical shaft, and
   a plurality of spacers, each of said spacers having a hole in the center thereof for engaging said vertical shaft, said spacers being alternately arranged on said shaft with said solid planar oak members,
   wherein said planar oak members and spacers are secured to said vertical shaft between a lower nut engaging the lower end of said vertical shaft, and an upper nut engaging the upper end of said vertical shaft,
   and wherein the parameters of the oxidation and extraction reactions occurring during aging of the wine are known as a function of the surface:volume relationship of the container and its insert.

4. An apparatus of claim 3 wherein said insert is pre-assembled before placing in said container.

* * * * *

UNITED STATES PATENT AND TRADEMARK OFFICE
CERTIFICATE OF CORRECTION

PATENT NO. : 4,558,639

DATED : December 17, 1985

INVENTOR(S) : David E. Hojnoski

It is certified that error appears in the above-identified patent and that said Letters Patent is hereby corrected as shown below:

In Claim 1, Column 4, lines 20-21, delete "second", insert --said--.

Signed and Sealed this

Twenty-fifth Day of March 1986

[SEAL]

Attest:

Attesting Officer

DONALD J. QUIGG

Commissioner of Patents and Trademarks